US012595785B2

(12) United States Patent
Nikic et al.

(10) Patent No.: US 12,595,785 B2
(45) Date of Patent: Apr. 7, 2026

(54) IONIC THRUSTER METHODS AND APPARATUS FOR AIRCRAFT

(71) Applicant: The Boeing Company, Arlington, VA (US)

(72) Inventors: Dejan Nikic, Seattle, WA (US); Sean Keith Cossano, Seattle, WA (US)

(73) Assignee: The Boeing Company, Arlington, VA (US)

( * ) Notice: Subject to any disclaimer, the term of this patent is extended or adjusted under 35 U.S.C. 154(b) by 57 days.

(21) Appl. No.: 18/584,803

(22) Filed: Feb. 22, 2024

(65) Prior Publication Data

US 2025/0270984 A1 Aug. 28, 2025

(51) Int. Cl.
*F03H 1/00* (2006.01)

(52) U.S. Cl.
CPC ......... *F03H 1/0043* (2013.01); *F03H 1/0056* (2013.01)

(58) Field of Classification Search
CPC ............................. F03H 1/0043; F03H 1/0056
See application file for complete search history.

(56) References Cited

U.S. PATENT DOCUMENTS 2,765,975 A * 10/1956 Lindenblad ............. F04D 33/00 313/309
3,071,705 A * 1/1963 Coleman ................... F03H 1/00 62/3.1
4,924,937 A * 5/1990 Beal ........................ F28F 13/16 165/96
6,145,298 A * 11/2000 Burton, Jr. ............ F03H 1/0012 60/202
7,581,380 B2 * 9/2009 Wahl ..................... F03H 1/0043 60/202
7,584,601 B2 * 9/2009 Metcalfe, III ........ F03H 1/0037 60/202
11,835,064 B1 * 12/2023 Heeter .................... F04D 25/06

OTHER PUBLICATIONS

Wilson, et al., "An Investigation of Ionic Wind Propulsion", NASA/TM-2009-215822, National Aeronautics and Space Administration, Glenn Research Center, Dec. 2009, pp. 1-43. (Year: 2009).*

Qu et al., "Heat dissipation of electronic components by ionic wind from multi-needle electrodes discharge: Experimental and multi-physical analysis", International Journal of Heat and Mass Transfer, vol. 163, 2020, pp. 1-18. (Year: 2020).*

* cited by examiner

*Primary Examiner* — Lorne E Meade
(74) *Attorney, Agent, or Firm* — Hanley, Flight & Zimmerman, LLC

(57) ABSTRACT

Ionic thruster methods and apparatus for aircraft are disclosed. An example ionic thruster for aircraft includes a nozzle. The nozzle includes an outlet and an inlet, the inlet to receive fluid and containing an electrode mount. A ground electrode is disposed within the nozzle. Conducting pins are coupled to the electrode mount, each of the pins having a first end coupled to the electrode mount and a second end positioned closer to the ground electrode than the first end, the pins spaced apart from the ground electrode.

20 Claims, 9 Drawing Sheets

IONIC THRUSTER METHODS AND APPARATUS FOR AIRCRAFT

FIELD

This disclosure relates generally to aircraft and, more particularly, to ionic thruster methods and apparatus for aircraft.

BACKGROUND

In recent years, ionic wind has been studied as a mechanism to induce fluid flow. A high voltage electric field between two electrodes can cause air between the electrodes to ionize, which causes an electrical current in the form of a corona discharge. Moving particles within the corona discharge collide with neutral particles in the air, inducing movement of the surrounding air. Thus, a prolonged or sustained corona discharge creates airflow that is often called ionic wind. Ionic wind can be utilized in aircraft to generate thrust. Currently ionic wind thrusters utilize wire electrodes on or near leading edges of wings.

SUMMARY

An example ionic thruster for aircraft described herein includes a nozzle including an outlet and an inlet, the inlet to receive fluid and containing an electrode mount, a ground electrode disposed within the nozzle, and conducting pins coupled to the electrode mount, each of the pins having a first end coupled to the electrode mount and a second end positioned closer to the ground electrode than the first end, the pins spaced apart from the ground electrode.

An example aircraft described herein includes a voltage source and a thruster including a body. The body includes an outlet and an inlet, the body to receive fluid and containing an electrode mount, a ground electrode disposed within the body and electrically coupled to the voltage source, and conducting pins coupled to the electrode mount and electrically coupled to the voltage source, each of the pins having a first end coupled to the electrode mount and a second end positioned closer to the ground electrode than the first end.

An example method for generating thrust on an aircraft is described herein. The method includes providing a voltage to a thruster. The thruster including a nozzle including an outlet and an inlet, the inlet to receive air, an electrode mount disposed within the inlet, a ground electrode disposed within the nozzle, and conducting pins coupled to the electrode mount, each of the pins having a first end coupled to the electrode mount and a second end positioned closer to the ground electrode than the first end, the pins spaced apart from the ground electrode. The method includes generating a corona discharge with the voltage, the corona discharge to extend between the conducting pins and the ground electrode, and inducing an ionic wind with the corona discharge, the ionic wind to generate the thrust.

The features, functions, and advantages of that have been discussed can be achieved independently in various embodiments or may be combined in yet other embodiments further details of which can be seen with reference to the following description and drawings.

Figure 1:
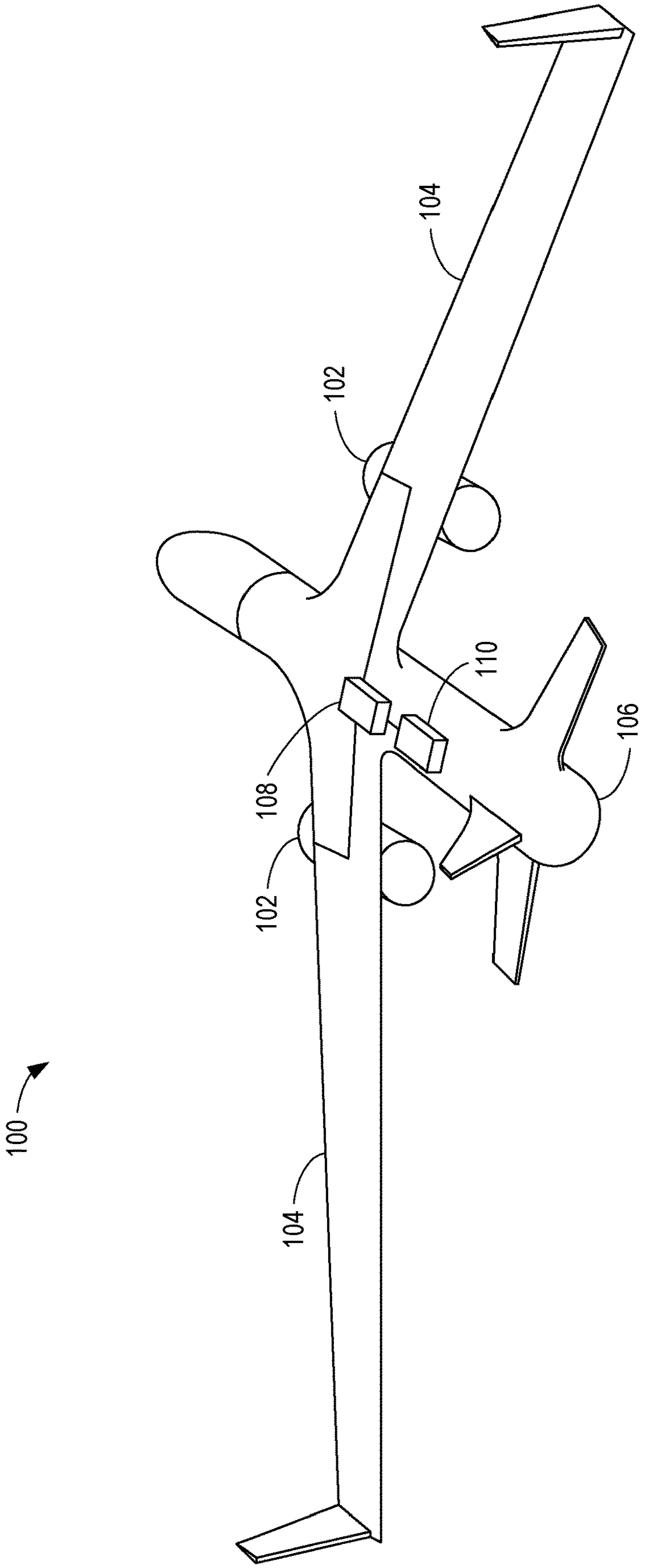
FIG. 1 is an example aircraft on which an example ionic thruster can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Known ionic wind thrusters for aircraft utilize wires as electrodes to generate an electric field. While a wire electrode allows for an even distribution of an electric field across a long surface, such as the leading edge of a lift surface, the electric field is limited in strength. An electric field strength can be increased by using an electrode geometry that ends in a sharp surface, such as a blade or a tip of a pin. Example ionic thrusters described herein utilize pin shaped electrodes to generate stronger electric fields and corresponding stronger thrusts than current ionic wind thrusters. Known ionic wind thrusters are required to be placed in front of surfaces such as wings to generate thrust. In contrast, ionic thrusters described herein can be fixed to an aircraft in any advantageous position or configuration, such as under a wing or on a tail. Thus, the ionic thrusters described herein can be easily integrated into many existing aircraft designs.

FIG. 1 is an example aircraft 100 on which an example ionic thruster 102 can be implemented. The example aircraft 100 is an unmanned aircraft with example wings 104 and an example tail 106. The ionic thrusters 102 are mounted under the wings 104. In some examples, the ionic thrusters 102 can be mounted in a different location (e.g., a different position under the wing, over the wing, on the tail, etc.). In some examples, the aircraft 100 can be a different kind of aircraft (e.g., drone, balloon, loitering aircraft, etc.). The example ionic thrusters 102 are illustrated with a cylindrical shape. In some examples, the ionic thrusters 102 can have a different shape. In some examples, the ionic thrusters 102 are surrounded by an aerodynamic surface (e.g., fairings). In other examples, the ionic thrusters 102 are mounted in nacelles extending from the aircraft 100. In some examples, the ionic thrusters 102 are movably mounted (e.g., mounted on a gimbal) on the aircraft. The example aircraft 100 of FIG. 1 also includes an example voltage source 108 (e.g., battery, fuel cell, generator, solar panel, capacitor, etc.) to provide voltage to the ionic thrusters 102. As described in more detail in reference to FIG. 4, the ionic thrusters 102 are powered by the voltage source 108 to produce thrust for the aircraft 100. An example controller 110 connects to systems of the aircraft 100 (e.g., the voltage source 108, the thrusters 102, etc.) to at least direct the systems' functions and modify an amount of power (e.g., voltage, current, etc.) being supplied to the systems. The controller 110 can be implemented by any type(s) and/or any number(s) of semiconductor device(s) (e.g., microprocessor(s), microcontrollers(s), etc.) and/or circuit(s).

Figure 2B:
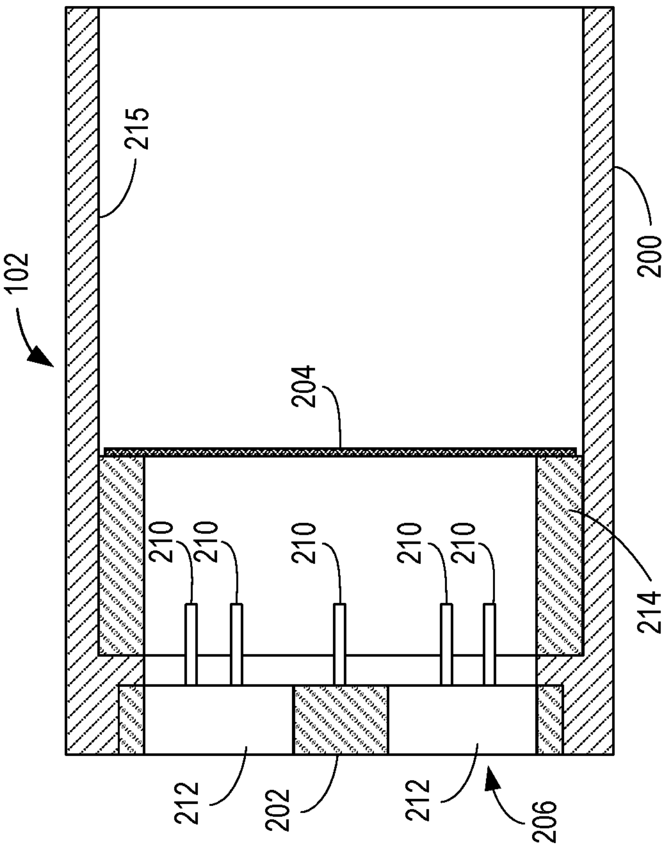
FIGS. 2A and 2B are cross-section illustrations of the example ionic thruster of FIG. 1.
Figure 2A:
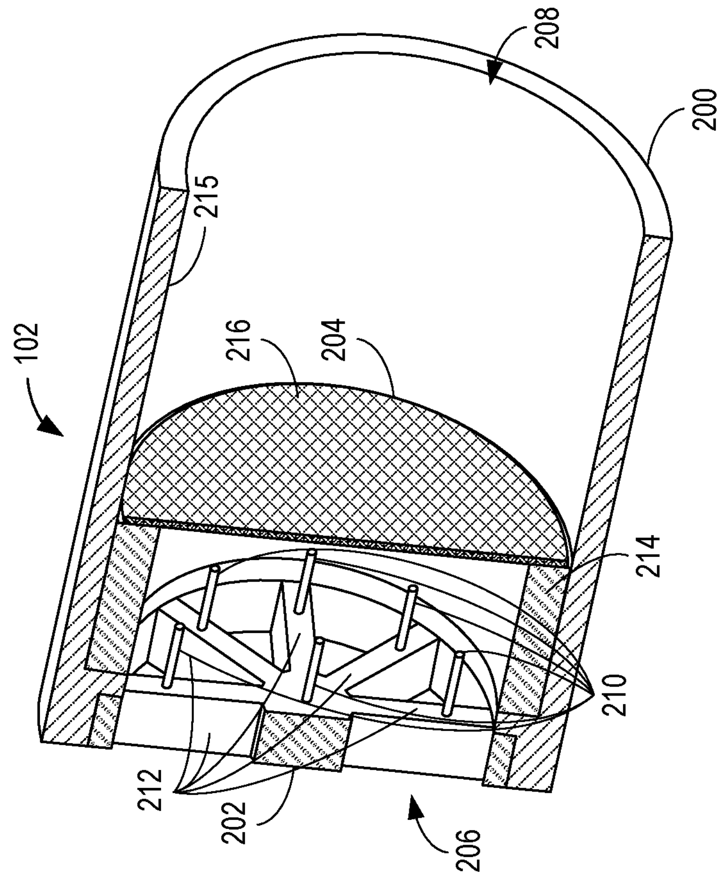

FIGS. 2A and 2B are cross-section illustrations of the example ionic thruster 102 of FIG. 1. The ionic thruster 102 includes an example nozzle 200, an example electrode mount 202, and an example ground electrode 204. The nozzle 200 directs fluid (e.g., air, atmosphere, etc.) to flow through the ionic thruster 102. The nozzle 200 has an example inlet 206 to receive fluid and an example outlet 208 to eject thrust generating fluid. In this way, the outlet 208 directs the fluid and the resulting thrust in a direction relative to the example aircraft 100.

The electrode mount 202 of the example ionic thruster 102 of FIGS. 2A-2B is coupled to the inlet 206 of the nozzle 200. Example pins 210 (e.g., conducting pins, electrode pins, etc.) are coupled to the electrode mount 202 to support and orient the pins 210 relative to the ground electrode 204. The pins are aligned such that an end of a pin 210 is closer to the ground electrode 204 than an opposite end of the pin 210. In some examples, the pins 210 are oriented parallel to a central axis of the nozzle 200 between the inlet 206 and the outlet 208. In other examples, the pins 210 have a different alignment (e.g., perpendicular to the ground electrode 204, skewed from the central axis, etc.). The pins 210 are cylindrical in shape to facilitate generating an electric field at the tips of the pins 210. In other examples, the pins 210 can have different shapes (e.g., pointed tips, blades, sharp rings, etc.) to facilitate electric field generation. In some examples, the pins 210 are connected to the voltage source 108 through a series of conducting wires. In other examples, the electrode mount 202 is composed of a conductive material and the pins 210 are connected the voltage source 108 through the electrode mount 202.

The electrode mount 202 is shaped to allow fluid to flow through the nozzle 200. As such, the electrode mount 202 has holes or openings that allow fluids to flow through. The illustrated example of FIG. 2A shows the electrode mount 202 with a plurality of example radial supports 212 extending away from a central portion of the electrode mount 202 towards an internal wall 215 of the nozzle 200 (e.g., an internal wall of the inlet 206). In other examples, the electrode mount 202 can have any other shape that allows fluid to flow through the nozzle 200. In some examples, the electrode mount 202 is shaped to support an advantageous arrangement of the pins 210. In some examples, the electrode mount 202 is part of the nozzle 200 shaped to hold the pins 210.

In the ionic thruster 102 of FIGS. 2A-2B, the ground electrode 204 is coupled inside the nozzle 200. The ground electrode 204 is spaced apart from the pins 210 to allow for an electric field to form between the pins 210 and the ground electrode 204. FIGS. 2A-2B show the ground electrode 204 contacting and/or coupled to an example spacer 214. The spacer 214 maintains an example spacing between the pins 210 and the ground electrode 204. In other examples, the spacer 214 can be a different size. In some examples, the spacer 214 is not a separate component, but a geometric feature of the nozzle 200 that accepts the ground electrode 204. The example ground electrode 204 of FIG. 2A is a wire mesh that has example openings 216 to allow fluid to flow past the ground electrode 204 towards the outlet 208 of the nozzle 200. In some examples, the ground electrode 204 is a plate with holes that allow fluid to flow from the inlet 206 to the outlet 208. The holes can have any advantageous size or shape (e.g., circular, polygonal, etc.). The example ground electrode 204 is shown in FIG. 2A with an example thickness, but other example ground electrodes 204 can have a larger or smaller thickness. The ground electrode 204 is electrically coupled to the voltage source 108. In some examples, the nozzle 200 is composed of a non-conductive material (e.g., insulating material) to prevent current flow between the ground electrode 204, the pins 210, and/or the electrode mount 202. The nozzle 200 extends past the ground electrode 204, ending at the outlet 208 after an example distance. In other examples, the nozzle 200 extends a different distance (e.g., is shorter or longer). In some examples, the outlet 208 is coincident with the ground electrode 204 and the nozzle 200 does not extend past the ground electrode 204.

Figure 3:
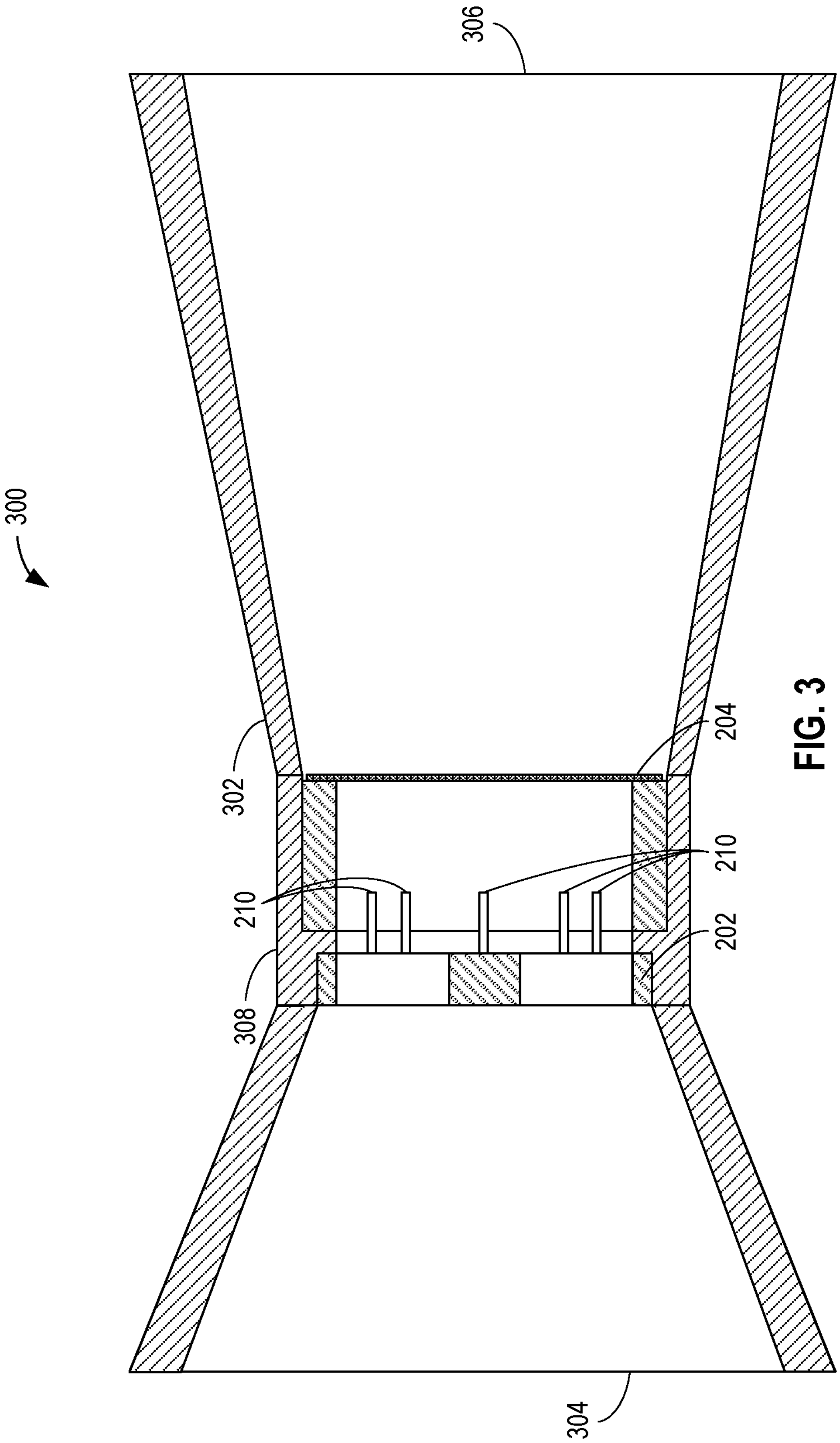
FIG. 3 is a cross-section illustration of an example ionic thruster that includes an example converging-diverging nozzle.

FIG. 3 is a cross-section illustration of an example ionic thruster 300 that includes an example converging-diverging nozzle 302. The nozzle 302 has an example inlet 304, an example outlet 306, an example thrust chamber 308 (housing the electrode mount 202, the pins 210, and the ground electrode 204). The inlet 304 couples to the thrust chamber 308 such that fluid flows from the inlet 304 into the thrust chamber 308. In some examples, the electrode mount 202 is coupled to the inside of the thrust chamber 308, adjacent to the inlet 304. The pins 210 are coupled to (e.g., embedded in, welded to, or otherwise fixed to) the electrode mount 202. The pins 210 extend from the electrode mount 202 towards the ground electrode 204. The ground electrode 204 is coupled to the inside of the thrust chamber 308, opposite the electrode mount 202. The outlet 306 couples to the thrust chamber 308 opposite the inlet 304, such that fluid flows from the thrust chamber 308 into the outlet 306. In some examples, the ground electrode 204 is coupled to the inside of the thrust chamber 308 adjacent to the outlet 306. The inlet 304 and the outlet 306 have larger cross-sectional areas (e.g., diameters, openings, etc.) at the outermost ends that reduce or converge to meet the smaller cross-sectional area of the thrust chamber 308. In other words, the nozzle 302 converges from the inlet 304 to the thrust chamber 308, and the nozzle 302 diverges from the thrust chamber 308 to the outlet 306. In this way, the inlet 304 speeds up fluid as it enters the thrust chamber 308 and back pressure is reduced as the fluid exits the outlet 306. At high altitudes, the inlet 304 compresses fluid (e.g., air) to facilitate generating a corona discharge and reduce the chance of an arc forming between the pins 210 and the ground electrode 204. The example converging-diverging nozzle 302 has an example geometry including an inlet length and diameter (e.g., cross-sectional area); an example outlet length and diameter (e.g., cross-sectional area); and an example thrust chamber length and diameter (e.g., cross-sectional area). Other examples can have example inlets 304, outlets 306, and thrust chambers 308 with different lengths, diameters (e.g., cross-sectional areas), and/or geometries. In some examples, the inlet 304 and/or the outlet 306 increase in area linearly (e.g., conically). In other examples, the inlet 304 and/or the outlet 306 have non-linear increases in area (e.g., curved, parabolic, stepwise increases, etc.) In some examples, the cross-sections are not circular (e.g., polygonal, etc.). In some examples, the cross-sections of the inlet 304, thrust chamber 308, and the outlet 306 are coaxial with a central axis. In other examples, the cross-sections of the inlet 304, the thrust chamber 308, and the outlet 306 do not share a common central axis (i.e., are not coaxial). In some examples, the inlet 304 converges and the outlet 306 has a constant diameter. In other examples, the inlet 304 has a constant diameter and the outlet 306 diverges.

Figure 4:
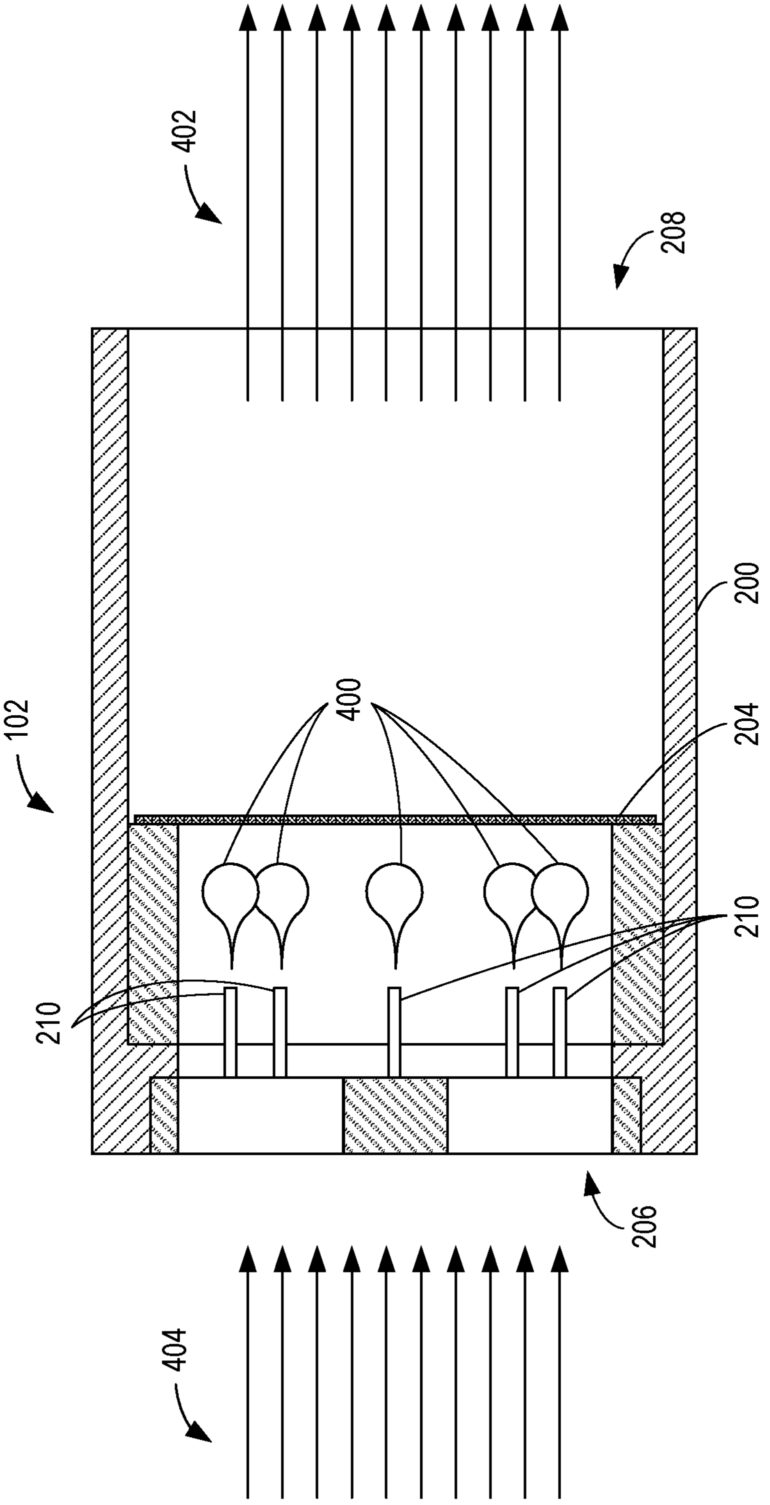
FIG. 4 illustrates example corona discharges and example ionic wind resulting from operation of the example ionic thruster of FIGS. 2A-2B.

FIG. 4 illustrates example corona discharges 400 and example ionic wind 402 resulting from operation of the example ionic thruster 102 of FIGS. 2A-2B. An example fluid 404 (e.g., atmosphere, air, etc.) enters the ionic thruster 102 at the inlet 206. In some examples, the fluid 404 enters the ionic thruster 102 at a pressure determined by the ambient environment. The pins 210 receive a voltage from the voltage source 108 (not shown). In some examples, the voltage provided to the pins 210 is high (e.g., 10 kilovolts, 20 kilovolts, etc.). In some examples the voltage can vary based on flight conditions (e.g., altitude, air speed, etc.) of the aircraft 100 of FIG. 1. In some examples, the voltage source 108 provides rapidly pulsed voltage to the pins 210. The voltage difference between the pins 210 and the ground electrode 204 generates an electric field. The electric field, in turn, causes corona discharges 400 between the pins 210 and the ground electrode 204. The corona discharges 400 are composed of ionized particles of the fluid 404 that move towards the ground electrode 204. Neutral particles of the fluid 404 are accelerated by the corona discharges 400 and flow through ground electrode 204, creating ionic wind 402 (e.g., ion wind, corona wind, electric wind, etc.) that exits the nozzle 200 at the outlet 208. The corona discharges 400 and ionic wind 402 cause a thrust reaction in the ionic thruster 102, which allows the ionic thruster 102 to generate thrust for the aircraft 100 of FIG. 1.

Figure 5:
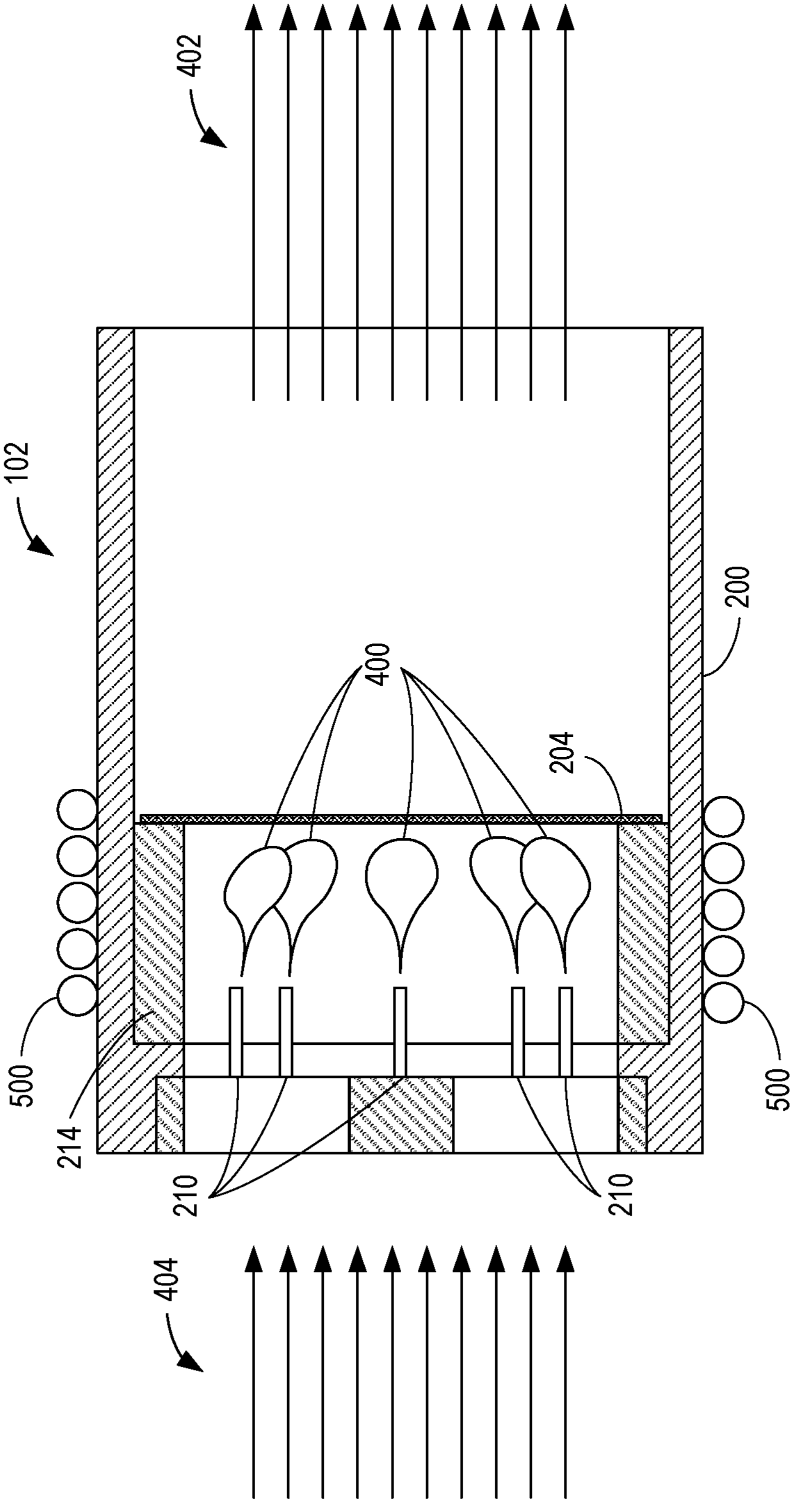
FIG. 5 illustrates example corona discharges and example ionic wind resulting from operation of an example ionic thruster that includes an example electromagnet to guide the corona discharges.

FIG. 5 illustrates example corona discharges 400 and example ionic wind 402 resulting from operation of the example ionic thruster 102 that includes an example electromagnet 500 to guide the corona discharges 400. The electromagnet 500 is positioned to surround the corona discharges 400. In other words, the electromagnet 500 surrounds at least the space between the pins 210 and the ground electrode 204. In some examples, the electromagnet 500 extends beyond the pins 210 and the ground electrode 204. FIG. 5 shows the electromagnet 500 in contact (e.g., surrounding) with the nozzle 200. In other examples, the electromagnet 500 can be embedded or otherwise located within the nozzle 200 or the spacer 214. Power is supplied to the electromagnet 500 to generate a magnetic field. The magnetic field guides (e.g., constricts or converges, etc.) the corona discharges 400 towards the center (e.g., a central axis) of the nozzle 200 and/or the center of the electromagnet 500. In this way, the magnetic field generated by the electromagnet 500 acts as a converging nozzle for the fluid ions that make up the corona discharges 400 to increase a velocity of the corona discharges 400 and the resulting ionic wind 402. In some examples, the operation of the electromagnet 500 can be varied continuously from full power to no power (e.g., a deactivated state). In this way, the corona discharges 400 and the resulting thrust generated by the ionic thruster 102 can be modified based on modifying the power supplied to the electromagnet 500. In some examples, the electromagnet 500 is powered with non-continuous voltage (e.g., pulsed voltage, pulse width modulated voltage, cyclic voltage, etc.). In some examples, the electromagnet 500 is a permanent magnet that does not receive power but continually generates a magnetic field.

Figure 6B:
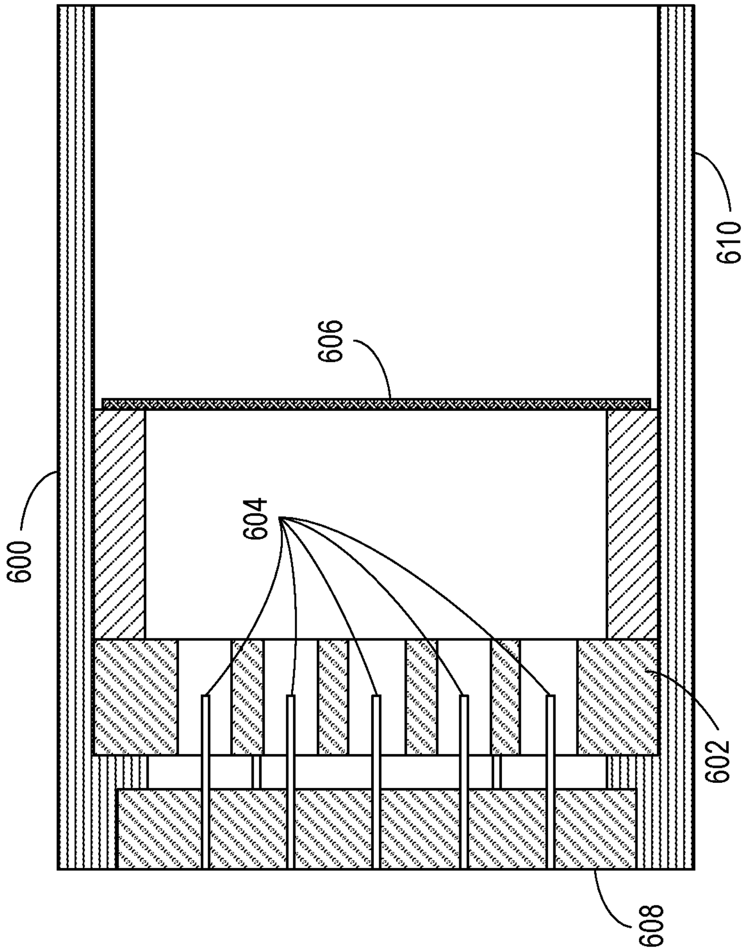
FIGS. 6A and 6B are cross-section illustrations of an example ionic thruster that include an example dielectric guide.
Figure 6A:
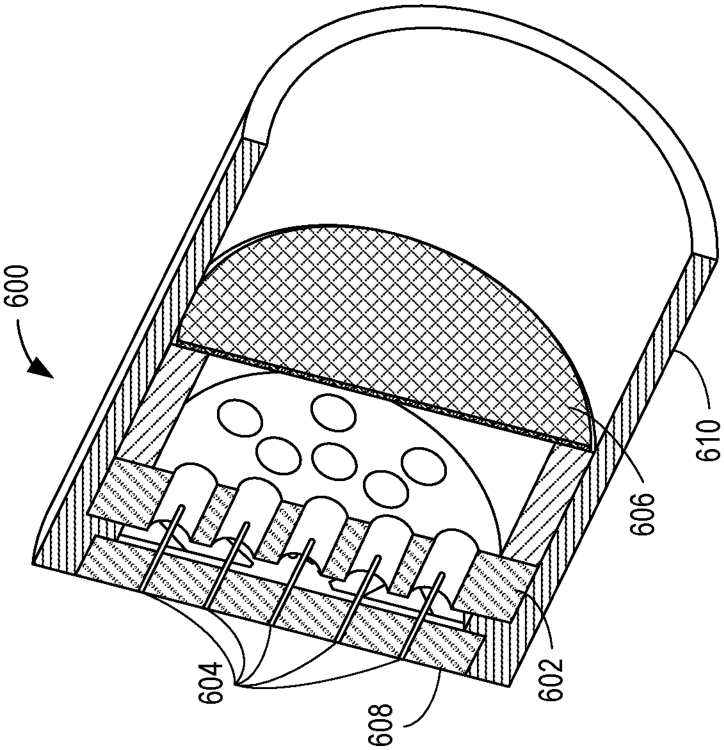

FIGS. 6A and 6B are cross-section illustrations of an example ionic thruster 600 that includes an example dielectric guide 602. The dielectric guide 602 surrounds the pins 604 while leaving channels (e.g., holes) for fluid to flow through the dielectric guide 602. The dielectric guide 602 extends past the example pins 604 towards an example ground electrode 606. In this way, the dielectric guide 602 isolates the pins 604 so that the electric field and/or corona discharge originating from a pin 604 interferes less with the electric field and/or corona discharge originating from a different nearby pin 604. Therefore, a higher density (e.g., number) of pins 604 can generate corona discharges in a smaller area, making the generation of ionic wind and thrust more efficient. In some examples, the dielectric guide 602 is spaced apart from an example electrode mount 608. In other examples, the dielectric guide 602 is in contact with the electrode mount 608. In some examples, the dielectric guide 602 is coupled to an interior surface of an example nozzle 610 of the ionic thruster 600. In other examples, the dielectric guide 602 and the nozzle 610 are one piece. The example ionic thruster 600 of FIGS. 6A-6B is similar to the example ionic thruster 102 of FIGS. 2A-2B with an addition of the dielectric guide 602. As such, it should be understood that some components of the ionic thrusters 102, 600 are similar and/or interchangeable (e.g., the ground electrodes 204, 606, the nozzles 200, 610, the pins 210, 604, etc.).

Figure 7:
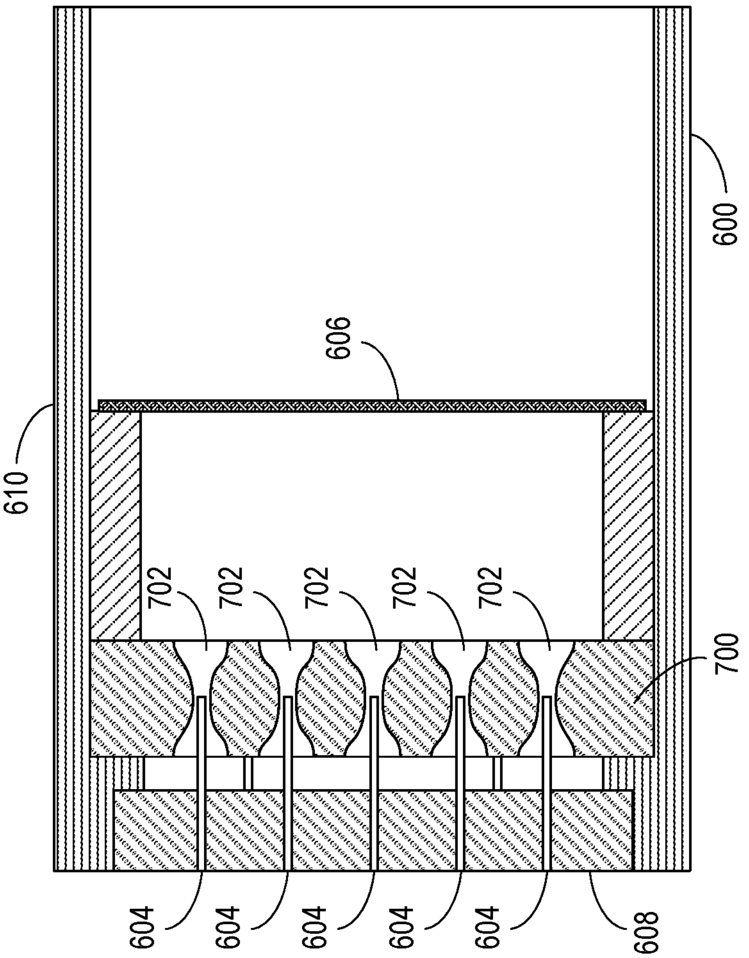
FIG. 7 illustrates the example ionic thruster of FIGS. 6A-6B with an example dielectric guide that includes example converging-diverging geometry.

FIG. 7 illustrates the example ionic thruster 600 of FIGS. 6A-6B with an example dielectric guide 700 that includes an example converging-diverging geometry 702. The converging-diverging geometry 702 provides holes or passages that converge (e.g., shrink in diameter) towards the tips of the pins 604 from one end of the hole, and then diverge (e.g., grow in diameter) towards an opposite end of the hole. The converging-diverging geometry 702 of the dielectric guide 700 causes fluid pressure to increase as it approaches the end of the respective pin 604. Similar to the converging-diverging nozzle 302 of FIG. 3, the increased pressure from the converging-diverging geometry 702 causes an increased generation of thrust in the ionic thruster 600. Additionally, the increased pressure at the end of the pin 604 (e.g., the point at which a corona discharge is initiated) facilitates corona generation and lessens frozen flow losses in thrust generation. In some examples, the dielectric guide 700 is coupled to an interior surface of an example nozzle 610 of the ionic thruster 600. In other examples, the dielectric guide 700 and the nozzle 610 are one piece.

Figure 8B:
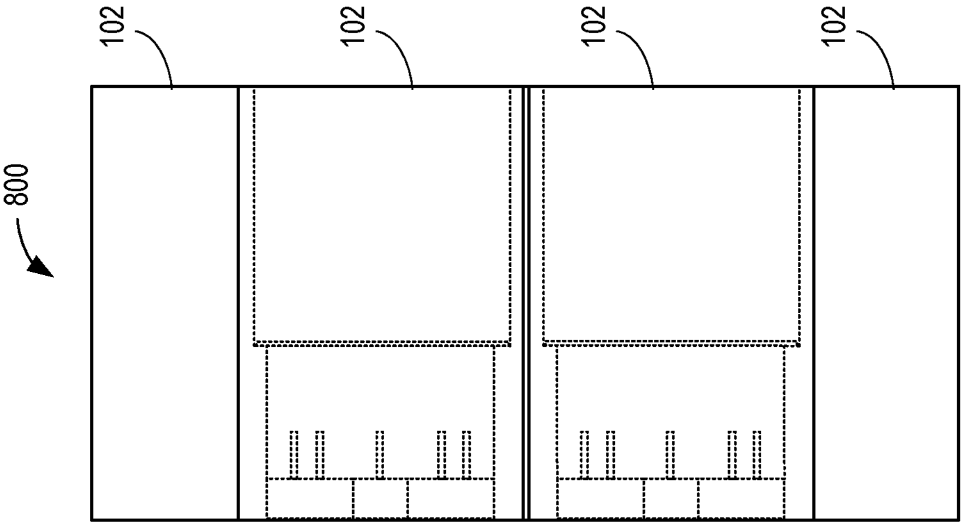
FIGS. 8A and 8B illustrate a front and a side view of an example arrangement of the example ionic thrusters of FIG. 1 to form a larger ionic thruster.
Figure 8A:
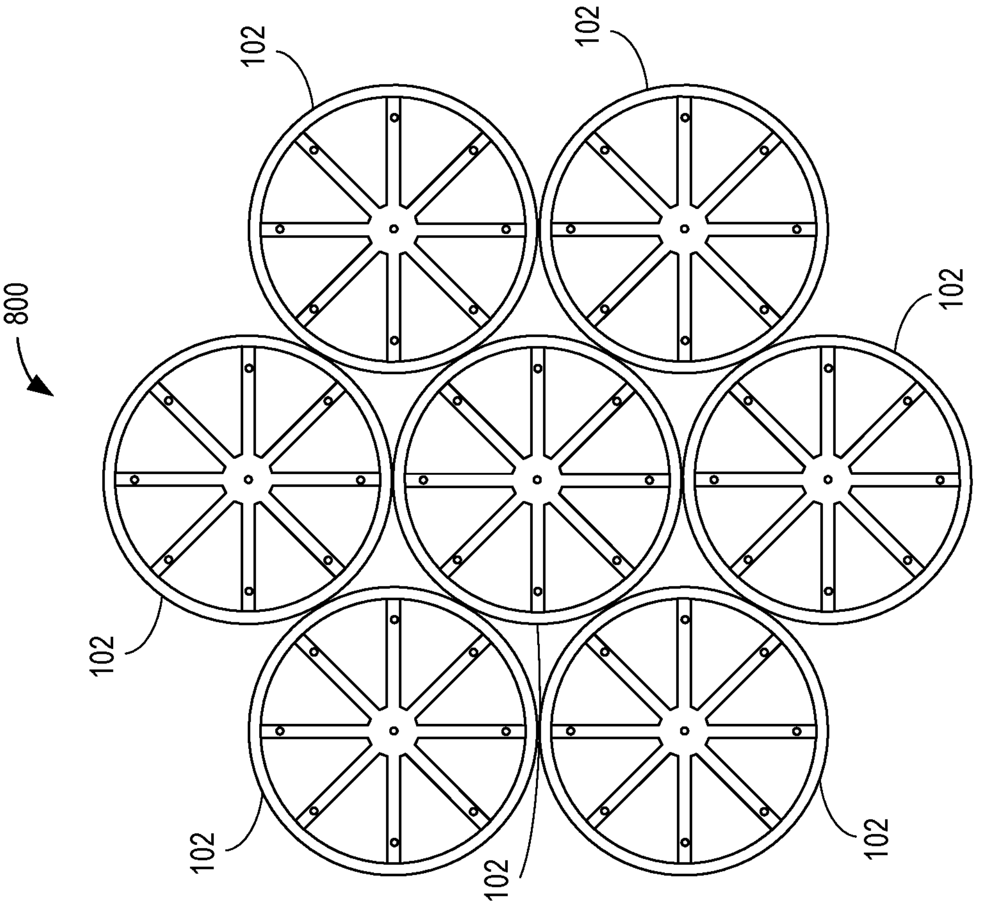

FIGS. 8A and 8B illustrate a front and a side view of an example arrangement 800 of the example ionic thrusters 102 of FIG. 1 to form a larger ionic thruster. The arrangement 800 shows the ionic thrusters 102 in a hexagonal (e.g., honeycomb) pattern. In other examples, the arrangement 800 can include a different number of ionic thrusters 102 in a different pattern. The arrangement 800 allows for a larger thrust to be generated using similar ionic thrusters 102. In this way, the same ionic thrusters 102 and/or thruster components can be used to propel aircraft with larger thrust requirements. Similarly, larger thrust can be developed without requiring the voltage source to provide a different (e.g., larger) voltage to the thruster.

Figure 9:
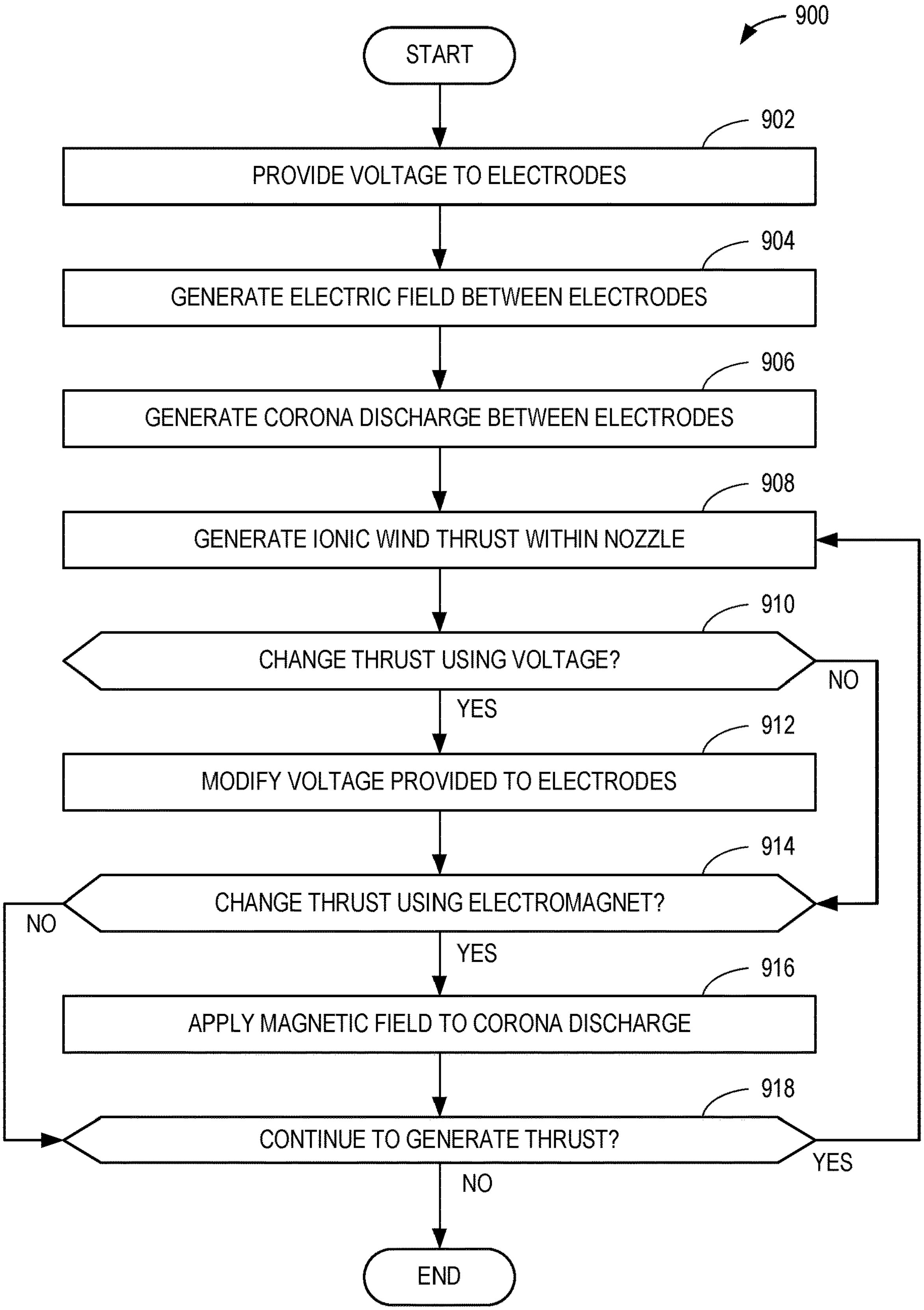
FIG. 9 is a flowchart describing an example method of generating and controlling thrust for an aircraft using an ionic thruster.

FIG. 9 is a flowchart describing an example method 900 of generating and controlling thrust for an aircraft using an ionic thruster. In some examples, the method 900 can be performed by a controller of the aircraft (e.g., the controller 110). The example method 900 begins at block 902, at which the controller directs a voltage source (e.g., the voltage source 108) to provide a voltage to electrodes of an ionic thruster (e.g., the pins 210 and the ground electrode 204 of the ionic thruster 102). The method 900 continues to block 904 where the provided voltage generates an electric field between the electrodes. The electric field strength is based on the magnitude of voltage that is supplied to the electrodes. The method 900 continues to block 906 where the electric field generates a corona discharge (e.g., corona discharge 400) between the electrodes. Once the electric field strength reaches a threshold level, a fluid (e.g., the fluid 404, air, etc.) between the electrodes ionizes and a corona discharge forms. The method 900 continues to block 908 where the corona discharge causes ionic wind (e.g., ionic wind 402) to generate thrust within the nozzle (e.g., nozzle 200 of ionic thruster 102). The charged particles of the corona discharge collide with neutral particles of the fluid in the ion thruster to create ionic wind, which results in a generation of thrust. The method 900 continues to block 910, at which the controller determines whether to change the thrust using voltage. If not, the method 900 moves to block 914. Otherwise, the method 900 proceeds to block 912 where the voltage provided to the electrodes is changed by the controller. A higher voltage produces a stronger corona discharge (e.g., more charged particles are produced), whereas a lower voltage produces a weaker corona discharge (e.g., fewer charged particles are produced). Therefore, the ionic wind and resultant thrust will change in response to a change in the amount of voltage applied. The method 900 continues to block 914, at which the controller determines whether to change the thrust using an electromagnet (e.g., electromagnet 500). If not, the method 900 moves to block 918. Otherwise, the method 900 proceeds to block 916 where the controller directs the electromagnet to apply a magnetic field to the corona discharge. The magnetic field causes the charged particles of the corona discharge to narrow (e.g., move closer together) and increase speed exiting the ionic thruster. The magnitude of the magnetic pressure varies based on a strength of the magnetic field and, therefore, power supplied to the electromagnet. Thus, thrust can be increased based on the power supplied to the electromagnet. The method 900 continues to block 918, at which the controller determines whether to continue generating thrust. If so, the method 900 returns to block 908. Otherwise, the method 900 ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

From the foregoing, it will be appreciated that example systems, apparatus, articles of manufacture, and methods have been disclosed that generate thrust for aircraft. Further examples and combinations thereof include the following:

Example 1 includes a thruster for aircraft including a nozzle. The nozzle includes an outlet and an inlet, the inlet to receive fluid and containing an electrode mount. A ground electrode is disposed within the nozzle. Conducting pins are coupled to the electrode mount, each of the pins having a first end coupled to the electrode mount and a second end positioned closer to the ground electrode than the first end, the pins spaced apart from the ground electrode.

Example 2 includes the thruster as recited in example 1, further including a voltage source coupled to the conducting pins and the ground electrode, the voltage source to create an electric field between the pins and the ground electrode.

Example 3 includes the thruster as recited in example 2, wherein the electric field is to generate a corona discharge.

Example 4 includes the thruster as recited in example 3, further including an electromagnet, the electromagnet to surround a space between the pins and the ground electrode, the electromagnet to direct the corona discharge towards a central axis of the nozzle, the central axis to extend between the inlet and the outlet.

Example 5 includes the thruster as recited in example 1, wherein the nozzle is composed of a non-conductive material.

Example 6 includes the thruster as recited in example 1, wherein the conducting pins are parallel to a central axis of the nozzle, the central axis to extend between the inlet and the outlet.

Example 7 includes the thruster as recited in example 1, wherein the electrode mount is composed of a conductive material.

Example 8 includes the thruster as recited in example 1, further including a dielectric guide having holes therethrough, the holes to surround the pins and allow fluid to flow from the inlet to the outlet.

Example 9 includes the thruster as recited in example 8, wherein each hole converges towards an end of a respective one of the pins.

Example 10 includes the thruster as recited in example 1, wherein the ground electrode is a plate having holes to allow fluid to flow between the inlet and the outlet.

Example 11 includes the thruster as recited in example 1, wherein the electrode mount includes radial supports extending away from a center of the electrode mount to an internal wall of the nozzle.

Example 12 includes the thruster as recited in example 1, wherein the nozzle converges between the inlet and the outlet.

Example 13 includes an aircraft including a voltage source and a thruster. The thruster includes a body including an outlet and an inlet, the body to receive fluid and containing an electrode mount, a ground electrode disposed within the body and electrically coupled to the voltage source, and conducting pins coupled to the electrode mount and electrically coupled to the voltage source, each of the pins having a first end coupled to the electrode mount and a second end positioned closer to the ground electrode than the first end.

Example 14 includes the aircraft as recited in example 13, wherein the voltage source is to cause a corona discharge between the conducting pins and the ground electrode.

Example 15 includes the aircraft as recited in example 14, further including an electromagnet surrounding the respective second ends of the conducting pins and the ground electrode, the electromagnet to narrow the corona discharge between the pins and the ground electrode.

Example 16 includes the aircraft as recited in example 13, wherein the body is composed of a non-conductive material.

Example 17 includes the aircraft as recited in example 13, further including a dielectric guide having holes therethrough and surrounding the pins to allow fluid to flow through the dielectric guide.

Example 18 includes a method for generating thrust on an aircraft. The method includes providing a voltage to a thruster, the thruster including a nozzle including an outlet and an inlet, the inlet to receive air, an electrode mount disposed within the inlet, a ground electrode disposed within the nozzle, and conducting pins coupled to the electrode mount, each of the pins having a first end coupled to the electrode mount and a second end positioned closer to the ground electrode than the first end, the pins spaced apart from the ground electrode. The method includes generating a corona discharge with the voltage, the corona discharge to extend between the conducting pins and the ground electrode, and inducing an ionic wind with the corona discharge, the ionic wind to generate the thrust.

Example 19 includes the method as recited in example 18, wherein a magnitude of the thrust changes in response to a change in the voltage.

Example 20 includes the method as recited in example 18, the method further including providing a magnetic field around the corona discharge, the magnetic field to be generated by an electromagnet, the magnetic field to affect the corona discharge to increase the thrust.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A thruster for aircraft comprising:

a nozzle including an outlet and an inlet, the inlet to receive fluid and containing an electrode mount;

a spacer at an inner diameter of the nozzle and extending along a portion of a length of the nozzle;

a ground electrode contacting a distal end of the spacer within the nozzle, the length of the nozzle extending past the ground electrode;

conducting pins coupled to the electrode mount, each of the pins having a first end coupled to the electrode mount and a second end positioned closer to the ground electrode than the first end, the pins spaced apart from the ground electrode by the spacer; and an electromagnet surrounding a space between the pins and the ground electrode, the electromagnet extending beyond the pins and the ground electrode along the length of the nozzle, the electromagnet to direct a corona discharge from the pins towards a central axis of the nozzle.

2. The thruster as recited in claim 1, further including a voltage source coupled to the conducting pins and the ground electrode, the voltage source to create an electric field between the pins and the ground electrode.

3. The thruster as recited in claim 2, wherein the electric field is to generate the corona discharge.

4. The thruster as recited in claim 1, wherein the central axis extends between the inlet and the outlet.

5. The thruster as recited in claim 1, wherein the nozzle is composed of a non-conductive material.

6. The thruster as recited in claim 1, wherein the conducting pins are parallel to the central axis of the nozzle, the central axis to extend between the inlet and the outlet.

7. The thruster as recited in claim 1, wherein the electrode mount is composed of a conductive material.

8. The thruster as recited in claim 1, further including a dielectric guide having holes therethrough, the holes to surround the pins and allow fluid to flow from the inlet to the outlet.

9. The thruster as recited in claim 8, wherein each hole converges towards an end of a respective one of the pins.

10. The thruster as recited in claim 1, wherein the ground electrode is a plate having holes to allow fluid to flow between the inlet and the outlet.

11. The thruster as recited in claim 1, wherein the electrode mount includes radial supports extending away from a center of the electrode mount to an internal wall of the nozzle.

12. The thruster as recited in claim 1, wherein the nozzle converges between the inlet and the outlet.

13. An aircraft comprising:

a voltage source; and a thruster including:

a body including an outlet and an inlet, the body to receive fluid and containing an electrode mount;

a spacer at an inner diameter of the body and extending along a portion of a length of the body;

a ground electrode contacting a distal end of the spacer within the body and electrically coupled to the voltage source, the length of the body extending past the ground electrode;

conducting pins coupled to the electrode mount and electrically coupled to the voltage source, each of the pins having a first end coupled to the electrode mount and a second end positioned closer to the ground electrode than the first end; and an electromagnet surrounding a space between the pins and the ground electrode, the electromagnet extending beyond the pins and the ground electrode along the length of the body, the electromagnet to direct a corona discharge from the pins towards a central axis of the body.

14. The aircraft as recited in claim 13, wherein the voltage source is to cause the corona discharge between the conducting pins and the ground electrode.

15. The aircraft as recited in claim 13, wherein the electromagnet is to narrow the corona discharge between the pins and the ground electrode.

16. The aircraft as recited in claim 13, wherein the body is composed of a non-conductive material.

17. The aircraft as recited in claim 13, further including a dielectric guide having holes therethrough and surrounding the pins to allow fluid to flow through the dielectric guide.

18. A method for generating thrust on an aircraft, the method comprising:

providing a voltage to a thruster, the thruster including:

a nozzle including an outlet and an inlet, the inlet to receive air;

an electrode mount disposed within the inlet;

a spacer at an inner diameter of the nozzle and extending along a portion of a length of the nozzle;

a ground electrode contacting a distal end of the spacer within the nozzle, the length of the nozzle extending past the ground electrode;

conducting pins coupled to the electrode mount, each of the pins having a first end coupled to the electrode mount and a second end positioned closer to the ground electrode than the first end, the pins spaced apart from the ground electrode by the spacer;

an electromagnet surrounding a space between the pins and the ground electrode, the electromagnet extending beyond the pins and the ground electrode along the length of the nozzle;

generating a corona discharge with the voltage, the corona discharge to extend between the conducting pins and the ground electrode;

providing, by the electromagnet, a magnetic field to direct the corona discharge from the pins towards a central axis of the nozzle; and inducing an ionic wind with the corona discharge, the ionic wind to generate the thrust.

19. The method as recited in claim 18, wherein a magnitude of the thrust changes in response to a change in the voltage.

20. The method as recited in claim 18, the method further including:

providing the magnetic field around the corona discharge, the magnetic field to affect the corona discharge to increase the thrust.

* * * * *